United States Patent [19]
Cinadr

[11] Patent Number: 4,874,823
[45] Date of Patent: Oct. 17, 1989

[54] CHLORINATED POLYVINYL CHLORIDE-VINYL ACETATE COPOLYMERS HAVING GOOD LOW AND HIGH TEMPERATURE STABILITY

[75] Inventor: Bernard F. Cinadr, Brecksville, Ohio

[73] Assignee: The B. F. Goodrich Company, Akron, Ohio

[21] Appl. No.: 125,423

[22] Filed: Nov. 25, 1987

[51] Int. Cl.$^4$ ................................................. C08F 8/22
[52] U.S. Cl. .............................. 525/329.2; 525/330.3; 525/331.6; 525/356
[58] Field of Search ................ 525/330.3, 329.2, 331.6

[56] References Cited

U.S. PATENT DOCUMENTS

| | | | |
|---|---|---|---|
| 2,332,974 | 10/1943 | Lytton et al. | 260/86 |
| 2,989,415 | 6/1961 | Horton et al. | 117/31 |
| 3,100,762 | 8/1963 | Shockney | 260/92.8 |
| 3,287,336 | 11/1966 | Taylor | 525/330.3 |
| 3,627,853 | 12/1971 | Bond et al. | 260/878 B |
| 3,650,828 | 3/1972 | Higashi et al. | 117/235 |
| 3,681,137 | 8/1972 | Nagazono et al. | 117/235 |
| 3,983,302 | 9/1976 | Zucker | 428/425 |
| 4,039,732 | 8/1977 | Schoen et al. | 525/330.3 |
| 4,049,517 | 9/1977 | Adachi et al. | 525/330.3 |

*Primary Examiner*—Joseph L. Schofer
*Assistant Examiner*—Bernard Lipman
*Attorney, Agent, or Firm*—Daniel J. Hudak; Nestor W. Shust

[57] ABSTRACT

A chlorinated copolymer made from vinyl chloride monomers and vinyl containing comonomers such as vinyl acetate has good low (e.g., about 120° C.) and high (e.g., about 170° C.) temperature stability as measured by hydrogen chloride elimination. The copolymer is made by suspension polymerizing vinyl chloride monomers (from about 70 to about 95 percent by weight) and vinyl containing comonomers (from about 5 to about 30 percent by weight) and subsequently chlorinating the copolymer to add chloride sites to the vinyl chloride units as well as to the comonomer units such as vinyl acetate. After chlorination, the copolymer is subjected to a heat treatment chlorination process whereby the stability of the copolymer is dramatically improved. The heat treatment chlorination process comprises heating the copolymer to temperatures generally in excess of 100° C. to degrade the resin whereby hydrogen chloride is liberated and then chlorinating the resin by adding pressurized chlorine thereto. One or more of such heat treatment additions are made. The heat treated chlorinated copolymer achieves better dispersement of magnetic materials and thus can be utilized in magnetic tapes and disks.

11 Claims, No Drawings

CHLORINATED POLYVINYL CHLORIDE-VINYL ACETATE COPOLYMERS HAVING GOOD LOW AND HIGH TEMPERATURE STABILITY

FIELD OF THE INVENTION

The present invention relates to a chlorinated polyvinyl chloride-vinyl component copolymer which has unexpectedly good low and high temperature stabilities and can be utilized for making magnetic tapes and disks.

BACKGROUND ART

Heretofore, copolymers of chlorinated polyvinyl chloride and vinyl acetate were generally produced by solution polymerization and had unsuitable properties, such as low temperature stability, for utilization in the production of magnetic tapes.

U.S. Pat. No. 2,332,974, to Lytton, et al relates to a chlorinated copolymer of vinyl chloride and vinyl acetate which is prepared via solution polymerization.

U.S. Pat. No. 2,989,415 to Horton relates to a magnetic recording media made from copolymers of butadiene and acrylonitrile.

U.S. Pat. No. 3,100,762 to Shockney relates to a specific post-halogenation of polyvinyl chloride resins or copolymers thereof wherein chloroform and ultraviolet illumination were utilized.

U.S. Pat. No. 3,627,853, to Bond, et al relates to a specific process for chlorinating suspension polymerized copolymers of vinyl chloride and vinyl acetate by adding the comonomer when at least 40 percent by weight of the vinyl chloride has been converted to polymer, the amount of the comonomer being less than the amount of the remaining unreactive vinyl chloride and subsequently polymerizing the mixture of the remaining vinyl chloride and copolymer at an elevated temperature and conducting after chlorination according to any known technique as in suspension, solution, etc., at a temperature of from about 70° to about 80° C.

U.S. Pat. No. 3,650,828, to Higashi, et al relates to a mixture of a high molecular weight vinyl chloride-vinyl acetate copolymer and a thermoplastic polyurethane-polyurea, hydroxyl-functional elastomer which is a reaction product of a mixture of a polyesterdiol, a hydrocarbon diol, a diphenyl sulfone diamine and an organic diisocyanate.

U.S. Pat. No. 3,681,137 to Nagazono relates to making a magnetic powder of utilizing a binder obtained from a mixture of butyl cellulose acetate resin, a urethane prepolymer, and a urethane elastomer.

U.S. Pat. No. 3,983,302 relates to a magnetic tape having a binder containing a vinyl terpolymer as made from vinyl chloride, vinyl acetate and glycol monoacrylate, and a diisocyanate.

A German article "Uber die Chlorierung von Polyvinylacetat und von Polymethacrylsauremethylester" by Von W. Hahn and F. Grafmuller date July 2, 1956, relates to chlorination of polyvinyl acetate or polymethyl methacrylate at relatively low temperatures.

SUMMARY OF THE INVENTION

Heat stabilized copolymers are made from a chlorinated vinyl chloride-vinyl component, for example vinyl acetate, copolymer by heat treatment chlorination. The heat treatment is conducted by heating the chlorinated copolymers to high temperatures, that is in excess of 100° C. and desirably in excess of 110° C. to degrade the copolymers followed by chlorination thereof by adding chlorine under a partial chlorine pressure of greater than 2 psia and generally up to about 60 psia. The heat treatment chlorination can be repeated as often as desired.

The resultant copolymer product has good low temperature stability at about 120° C. as well as good high temperature stability at about 170° C. as measured by hydrogen chloride elimination and also high heat distortion and high heat modulus. Moreover, the heat-treated chlorinated copolymer has unexpectedly been found to have good dispersion with regard to magnetic materials and thus is utilized as a binder in the production of magnetic tapes, disks, and the like.

DETAILED DESCRIPTION OF THE INVENTION

According to the concepts of the present invention, existing chlorinated copolymers are subjected to heat treatment chlorination to improve various properties thereof, especially low (about 120° C.) and high (about 170° C.) temperature stability. The copolymer is made by polymerizing vinyl chloride and a vinyl component. By the term "vinyl component," it is meant a vinyl type monomer other than vinyl chloride. Such monomers are well known to the art and to the literature and include methyl acrylate, methyl methacrylate, acrylonitrile, styrene, alpha methylstyrene, vinylidene chloride, and the like, with vinyl acetate being preferred. An amount of monomer is utilized to produce a copolymer containing from about 70 percent to about 95 percent by weight, desirably from about 80 percent to about 93 percent by weight, and preferably from about 85 percent to about 92 percent by weight of vinyl chloride repeating units therein. The remainder of the copolymer is made up of one or more of the above-noted vinyl component monomers, for example vinyl acetate. Thus, the amount of the one or more vinyl component comonomers is from about 5 to about 30 percent by weight, desirably from about 7 to about 20 percent by weight, and preferably from about 8 to about 15 percent by weight of non-vinyl chloride repeating units based upon the total weight of the copolymer. The polymerization is desirably a suspension method or process. Such a polymerization procedure is well known to the art as well as to the literature. It generally relates to the utilization of an aqueous system wherein the monomers are in a dispersed phase, an initiator is dissolved in a monomer phase, and the formed polymer is a dispersed solid.

The above copolymer can be chlorinated in any conventional manner as known to the art and to the literature to contain high amounts of chlorine therein, as for example from about 57 percent by weight to about 62 percent by weight based upon the total weight of the copolymer. It is to such existing chlorinated suspension polymerized copolymers that the heat treatment chlorination of the present invention is applied. Although the heat treatment chlorination or high temperature degradation and chlorination step of the present invention usually increases the amount of chlorine content of the copolymer by only a relatively small amount, that is generally from about 0.2 to about 2.0 percent and desirably from about 0.5 to about 1.5 percent by weight, the various properties imparted by such a heat treatment chlorination step or process are dramatically improved as noted hereinbelow. The heat treatment chlorination copolymers of the present invention generally have a chlorine content of from about 57 percent to about 65 percent by weight, desirably from about 61 percent to about 65 percent by weight, and preferably from about 63 or 64 percent by weight based upon the total weight of the copolymer.

The heat treatment chlorination of the present invention relates to heating the chlorinated copolymer to a high temperature, such as at least 100° C. The exact phenomena is not fully understood but is thought that heating at such high temperatures removes or eliminates some of the hydrogen chloride from the copolymer. In any event, the vinyl chloride-vinyl component copolymers of the present invention are heated to a temperature generally in excess of 100° C. and preferably in excess of 110° C. as up to about 130° C. The heat treatment or heating step generally takes place under pressure as from about 25 psia to about 75 psia and preferably from about 30 psia to about 50 psia. After heating the copolymer a suitable length of time, the heat-treated vinyl chloride-vinyl component type copolymer is chlorinated by the addition of chlorine thereto. The partial pressure of the chlorine gas is generally from about 2 to about 60 psia, desirably from about 5 to about 30 psia and preferably from about 10 to about 20 psia. This chlorination step adds a small amount of chlorine as set forth above, to the entire copolymer, that is, to both the vinyl chloride repeating units as well as to the remaining vinyl component repeating units. The chlorination temperature is generally maintained at the same level as during the heat degradation step. The above heat treatment chlorination step can be conducted any number of times as from a total of 1 to 6, desirably from 2 to 5, and preferably 2. The total time with regard to the one or more heat treatment chlorination steps is generally from about 20 minutes to about 4 hours with one or two hours being desired.

It has unexpectedly been found that the heat treatment chlorination product of the present invention has good high temperature as well as good low temperature stability. Low temperature stability, that is at a temperature of approximately 120° C. is measured by hydrogen chloride elimination at said temperature over a time period as from about a few hours to a few minutes. Utilizing a 20 minute basis at a temperature of 120° C., the copolymer resins of the present invention generally have a hydrogen chloride elimination of 0.0200 or less, desirably, 0.0050 or less, and preferably 0.0030 mole percent or less. The copolymers also have good high temperature stability as measured by hydrogen chloride elimination at approximately 170° C. over any suitable time period as for example 20 minutes. The copolymers of the present invention generally have a hydrogen chloride elimination loss at 20 minutes at 170° C. of 0.150, or less, desirably of 0.125 or less, and preferably of 0.100 mole percent or less. The dehydrochlorination procedure utilized for determining the thermal stability of the resin was as follows. Gaseous HCl eliminated from isothermally degraded resins are transported by an inert carrier gas into a flask containing deionized water. The concentration of HCl in the analyzer flask was determined by the continuous measurement of conductivity with a Yellow Springs conductance meter (Model 32). The standard test temperatures were 120° C. and 170° C.±0.1° C. High purity nitrogen was the carrier gas. The results were reported in terms of mol percent HCl lost as 20 minutes based on the total moles of HCl available from the sample.

The above results were generally unexpected since as apparent from the following examples, normally commercial available copolymers of vinyl chloride-vinyl acetate type copolymers made according to either a solution polymerization or a suspension polymerization but without any heat treatment chlorination did not nearly achieve low hydrogen chloride elimination or good stability.

The copolymers of the present invention can also contain conventional additives, fillers, plasticizers, and the like, in effective amounts as well as conventional amounts well known to the art and to the literature. Thus, various fillers, stabilizers, extenders, dyes, pigments, mold release agents, lubricants, plasticizers, and other conventional additives can be utilized.

Various magnet type materials such as iron have been found to have very good dispersion within the copolymers of the present invention. Accordingly, such copolymers are utilized in the application of magnetic type articles such as magnetic tapes, magnetic disks, videotapes, audio tapes, computer tapes, and the like.

The invention will be better understood by reference to the following examples.

Raw Materials

The chlorinated vinyl chloride-vinyl acetate copolymers can be commercially available solution resins such as UCAR VYHH or UCAR VYNS-3 (Union Carbide Corporation, USA) or suspension resins such as Geon 401C29 or 430C19 (B F Goodrich Canada Inc.). The chlorine was high purity grade (99.5 percent min.) supplied by Matheson. All the water used was house-distilled and polished by circulation through a two-stage purification system. The first stage contained activated carbon for removal of organic impurities (Barnstead cartridge D8904). The second stage was a mixed deionization resin with 1 megohm/cm endpoint (Barnstead cartridge D8902). Hydrochloric acid, sodium bicarbonate and sodium nitrate were A.C.S. reagent grade from Fisher Scientific. High-purity liquid nitrogen was used from an in-house distribution system supplied by Air Products. Guaranteed purity is 99.998 percent minimum with 3 ppm maximum oxygen and dew point or less than $-100°$ F.

Equipment and Procedures

The suspension chlorination reactions according to the present invention were carried out in a jacketed, two-gallon Glasteel Pfaudler reactor rated at 750 psig. The auxiliary equipment limited operation to 300 psig. Pressure relief was provided by a 1"-Zook Graphite-FEP rupture disc rated @ 300 psi. A $\frac{3}{4}$ horsepower motor with a Parajust AC speed control allowed 0 to 800 RPM operation of a dual-impeller agitator. The agitator shaft-seal was provided by a double mechanical rotary seal with an air cooled pressure lubricator. The seal liquid was water under nitrogen pressure. The agitator shaft was constructed of tantalum. The lower impeller was a titanium $3\frac{1}{2}$" diameter flat-blade disk-turbine with six $\frac{1}{4}$"×1" blades. The upper impeller was a tantalum downward pumping $2\frac{1}{2}$" diameter pitchedblade open-turbine with four $\frac{3}{8}$"×1" blades pitched 45°. The normal operating speed was 600 RPM. Baffling was provided mainly by a 1.5"×7" tantalum light-well assembly. A $\frac{1}{4}$" tantalum dip tube for charging chlorine and a $\frac{1}{4}$" tantalum thermowell provided additional baffling.

The ultraviolet (UV) source used in this work was a Western Quartz Products 180 watt, medium pressure, mercury-vapor lamp with a 3½" arc length. Operation at 100 percent, 75 percent, 50 percent, and 25 percent output was possible by use of a capacitor switching network within the power supply. Power output was monitored with a TIF Instruments 2000A clamp-on watt meter. The lamp was enclosed in a precision ground, 1.375" OD×0.900" ID×6⅞" long, Code 7740 PYREX tube encased in a tantalum holder-seal assembly suspended vertically through the reactor head.

Chlorine was supplied from cylinders which hold 150 pounds of liquid chlorine. This was done to ensure a consistent quality feed for a large series of runs. Approximately five pounds of chlorine vapor was vented prior to putting a new cylinder in service to purge dissolved oxygen from the chlorine. The chlorine was flash distilled from the cylinder before use to eliminate dissolved and suspended iron. The monel condenser was cooled with Freon 11. A methanol refrigerated circulating bath was used to cool the Freon 11 in a copper-tube heat exchanger. The chlorine charge system consisted of a calibrated Jogler liquid level gauge (¾" ID×72" long Pyrex tube rated for 100 psig @ 150° C.) into which the chlorine was distilled and a Lapp PULSA feeder Model LS-3 pump with dual head to feed the chlorine to the reactor. The chlorine side of the reagent head body was Carpenter 20 steel. The valves and diaphragm were made from Hastaloy C. Flourolube isolated the reagent head from the hydraulic system. Analysis showed that this system provided an essentially iron-free chlorine feed.

Reaction temperatures were manually controlled, generally within ±2° C., by regulation of the jacket-water temperature with a Meynell steam and water mixing valve. The reaction temperature was monitored with a platinum resistance thermometer (RTD). The pressure was manually controlled, generally within ±2 psi, by regulation of the chlorine feed rate with a Whitey Hastelloy C severe service union bonnet regulating valve (model HC-3NTF4-WPO). The reaction pressure was monitored with a Sensotec TJE series pressure transducer and Sensotec Model 450D amplifier/indicator. The pressure transducer was isolated from the reaction media by a Hildebrandt diaphragm seal model #100A, Fluorolube filled, with a tantalum diaphragm.

Vacuum was generated with a Kinney two-stage, liquid ring vacuum pump (model #KLRC-3) capable of producing absolute pressures down to 1–2 inches of mercury with water as the sealing liquid.

Chlorination

Three different types of chlorination were conducted, that is a process relating to a conventional suspension chlorination without any heat treatment chlorination, a process relating to a solution polymerization without any heat treatment chlorination, and a process wherein the chlorinated copolymer of Process 1 was heat-treated and chlorinated in accordance with the present invention.

Process 1

In a typical convention suspension chlorination 750 to 1000 grams of resin were slurried in 4500 grams of water containing 18.5 grams of sodium nitrate to passivate the titanium components. The slurry was transferred from the Pyrex make up vessel through the bottom valve of the reactor by vacuum. The agitator was turned on and the charge was heated to 50° C. The reactor was then evacuated by the vapor pressure of the water. Nitrogen or chlorine was then introduced to raise the pressure to 30 psia. The reactor was re-evacuated and chlorine was introduced through a tantalum dip tube to a point below the lower impeller. The charge was then heated to 80° C. and additional chlorine added to raise the pressure to 50 psia. The UV light was activated and samples were taken at the chosen chlorine addition levels. The samples were taken directly from the bottom discharge valve. Reactor pressure was maintained constant by adjusting the chlorine feed rate until the desired amount of chlorine had been added. Then the chlorine feed was stopped and the pressure was allowed to drop to a vacuum by continued reaction. The light was turned off and the reactor was discharged as follows:

The resin slurry was discharged directly from the reactor onto a 150 mm Buchner funnel fitted on a four-liter Erlenmeyer filtering flask. The resin was separated with vacuum. A sample of the filtrate was tested for iron with potassium thiocyanate solution. In general, the tested solutions were colorless indicating an iron level of less than 1 ppm; therefore resin samples were not routinely tested for iron. The wet-cake was reslurried in purified water and refiltered. Generally more than 95 percent of the hydrochloric acid was removed by this procedure. This wet cake was slurried in hot purified water and tested for residual free-chloride with potassium iodide-starch paper. The slurry was heated at 80°–90° C. until the test was negative. The remaining acid was then neutralized with sodium bicarbonate to a pH of 8–8.5. The slurry was heated for 30–60 minutes at 90°–100° C. with agitation to provide for diffusion and neutralization of the acid in the resin. Additional sodium bicarbonate was added, if necessary, to maintain a pH of 7–8.0 The neutralized slurry was filtered and the wet cake was washed with one liter of purified water to reduce the residual salt content. Typically the recovered resins contained less than 100 ppm sodium. The resins were then dried under vacuum for about 24 hours at 60°–70° C. Residual volatiles were reduced to less than 1 percent.

Process 2

Chlorinated copolymers were prepared according to U.S. Pat. No. 2,332,974, which is hereby fully incorporated by reference, via solution chlorination in a two-liter glass reactor. The resins were dissolved in chloroform containing benzoyl peroxide. Temperature was controlled at 50° C. Dry chlorine gas was passed through the reactor to maintain a small positive pressure.

Process 3

The heat-stabilized, postchlorinated resin according to the present invention is obtained as in Process 1 above except that once the desired amount of chlorine was reacted, the temperature is raised to 100°–120° C. to cause dehydrochlorination. After heat-treatment for 30–60 minutes, chlorine is charged to the reactor to raise the pressure to about 50 psia. The chlorine reacts readily in the absence of UV activation as shown from the decrease in pressure. The above heat-treatment can be repeated one or more times to obtain the most heat-stable product. Once the heat-treatment step has been completed, the resin is recovered in a manner as described in Process 1.

Chlorine analysis in the examples was determined as follows:

Chlorine Analysis

A density procedure was utilized. A Buehler AB specimen mount press was used to prepare the density specimens. Buttons were molded at 4200 psi for two minutes at 120°–130° C. Density was calculated from the weights of the specimen in air and methanol with the required temperature corrections. Weight percent chlorine is obtained from density - composition calibration curves established from wet chemical analysis of chlorinated PVC resins. Experience has shown that the test is sensitive to small changes in chlorine content. Typical standard deviations are less than 0.1 weight percent chlorine.

The following examples were prepared and tested with regard to hydrogen chloride illumination at 120° C. and 170° C. with the results set forth in Table I.

EXAMPLE 1

UCAR VYNS-3 (I.V.=0.74; 90 percent vinyl chloride, 10 percent vinyl acetate) was chlorinated by Process 1 for 185 minutes at 80° C. and 50 psia during which time 336 cc of chlorine were added to 1000 grams of resin. The chlorine feed was stopped. After 79 minutes the pressure had dropped to 18 psia and the charge was blown down. The recovered resin had a density of 1.4981 equivalent to 62.6 weight percent chlorine.

EXAMPLE 2

UCAR VYHH (I.V.=0.50; 86 percent vinyl chloride, 14 percent vinyl acetate was chlorinated by Process 1 for 160 minutes at 80° C. and 50 psia during which time 456 cc chlorine were added to 1000 grams of resin. Sixty-one minutes after the chlorine feed was stopped, the pressure had dropped to 16.7 psia and the charge was blown down. The recovered resin had a density of 1.5219 equivalent to 64.1 weight percent chlorine.

EXAMPLE 3

UCAR VYHH was chlorinated by Process 2. Seventy-five grams resin were dissolved in 980 grams chloroform containing 1.5 grams benzoylperoxide. Chlorine gas was passed through the solution for 6.5 hours. An additional 0.75 grams of benzoylperoxide was added and the reaction was carried out for an additional 7 hours. The resin was precipitated from solution with methanol, filtered and vacuum dried. The resin had a density of 1.5222 equivalent to 64.1 percent chlorine.

EXAMPLE 4

UCAR VYNS-3 was chlorinated by Process 2. Seventy-Five grams of resin were dissolved in 1700 grams of chloroform containing 1.5 grams benzoylperoxide. Chlorine gas was passed through the solution for 6.5 hours. An additional 0.75 grams of benzoylperoxide was added and the run was continued for an additional 7 hours. The resin, recovered as in Example 3, had a density of 1.4583 equivalent to 60.0 weight percent chlorine.

EXAMPLE 5

Geon 430C17 (I.V.=0.45; 86.2 percent vinyl chloride, 13.8 percent vinyl acetate) was chlorinated by Process 1 for 38 minutes at 80° C. and 50 psia during which time 233 cc of chlorine was added to 750 grams of resin. The chlorine feed was stopped and after 47 minutes the pressure had dropped to 13.0 psia and the charge was blown down. The resin had a density of 1.4811 equivalent to 61.5 weight percent chlorine.

EXAMPLE 6

Geon 401C29 (I.V.=0.48; 89.5 percent vinyl chloride, 10.5 percent vinyl acetate) was chlorinated by Process 1 for 38 minutes at 80° C. and 50 psia during which time 232 cc of chlorine were added to 750 grams of resins. The chlorine feed was stopped. The charge was blown down 51 minutes later when the pressure had dropped to 13.5 psia. The resin had a density of 1.4958 equivalent to 62.4 weight percent chlorine.

EXAMPLE 7

Geon 430C19 (I.V.=0.64; 90 percent vinyl chloride, 80 percent vinyl acetate) was chlorinated by Process 3 for 135 minutes at 80° C. and 50 psia during which time 216 cc of chlorine were added to 750 grams of resin. The charge was heated to 110° C. in 19 minutes, the pressure was 45.5 psia. Forty-nine minutes later the temperature had increased to 114° C. and the pressure had dropped to 31.8 psia. The pressure was increased to 41 psia by the addition of 4 cc of chlorine. Twenty-three minutes later the pressure had dropped to 34.1 psia with a temperature of 115° C. The pressure was increased to 41 psia by the addition of 6 cc of chlorine. Forty-eight minutes later the pressure had dropped to 33 psia at 114° C. The charge was cooled to 78° C., 14.4 psia in 18 minutes and blown down. The resin had a density of 1.5082 equivalent to 63.2 weight percent chlorine.

EXAMPLE 8

Example 7 was repeated. Ninety-two minutes were required to add 212 cc of chlorine. The charge was heated to 110° C. in 21 minutes, the pressure was 42.5 psia. Twenty-seven minutes later the temperature was 112° C. and pressure was 30.8 psia. Chlorine was added to raise the pressure to 41 psia. Thirty-three minutes later the pressure had decreased to 31.1 psia at 114° C. Chlorine was added to raise the pressure to 41.2 psia. Sixty-two minutes later the pressure had dropped to 31.6 psia at 115° C. The charge was cooled to 75° C., 12.3 psia in 20 minutes, and blown down. The resin had a density of 1.5095 equivalent to 63.3 weight percent chlorine.

TABLE I

| EXAMPLE NO. | CHLORINATION PROCESS NO. | HCl ELIMINATION[1] | |
|---|---|---|---|
| | | @ 120° C. | @ 170° C. |
| 1 | 1 | .0269 | .1260 |
| 2 | 1 | .0870 | .2103 |
| 3 | 2 | .0526 | .2464 |
| 4 | 2 | .1487 | .3527 |
| 5 | 1 | .0683 | — |
| 6 | 1 | .0583 | .2086 |
| 7 | 3 | .0006 | .0612 |
| 8 | 3 | .0015 | .0792 |

[1]mole percent HCl eliminated in 20 minutes

As apparent from Table I, Examples 1, 2, 5, and 6 which related to a conventional postchlorinated suspension prepared vinyl chloride-vinyl acetate copolymer yielded somewhat reduced HCl elimination amounts at both 120° C. and 170° C. in comparison with Examples 3 and 4 which related to a conventional postchlorination of a solution polymerization of vinyl chloride-vinyl acetate copolymer. However, when a chlorinated suspension polymerized vinyl chloride-vinyl acetate copolymer was subjected to a heat treatment chlorination in accordance with the present invention, dramatic improvements with regard to HCl elimination amounts were obtained. As apparent from Example 7, an elimination amount was obtained which was approximately 45 times lower than that of Example 1 (the best result obtained utilizing a conventional copolymerization suspension process). With regard to high temperature stability, that is at 170° C., the elimination amount was twice as great as Example 1.

It can thus be seen that the heat treatment chlorination of the present invention yields dramatic improvements and stability results at both low, that is 120° C., as well as high, that is 170° C., temperatures.

While in accordance with the patent statutes, the best mode and preferred embodiment has been set forth, the scope of the invention is not limited thereto, but rather by the scope of the attached claims.

What is claimed is:

1. A chlorinated vinyl chloride-vinyl component type copolymer having low temperature stability, comprising:

the chlorinated vinyl chloride-vinyl component type copolymer, said copolymer containing from about 57 percent to about 65 percent by weight of chlorine therein, said copolymer containing from about 70 percent to about 95 percent by weight of vinyl chloride repeating units therein based upon the total number of vinyl chloride and vinyl component repeating units and, from about 5 percent to about 30 percent by weight of vinyl component repeating units therein based upon the total weight of vinyl chloride repeating units and vinyl component repeating units, said vinyl component repeating unit made from monomers of vinyl acetate, methyl acrylate, methyl methacrylate, vinylidene chloride, alpha-methylstyrene, styrene, acrylonitrile, and combinations thereof, said chlorinated polyvinyl chloride-vinyl acetate type copolymer having a stability of 120° C. for 20 minutes as measured by hydrogen chloride elimination of 0.0050 mole percent or less.

2. A chlorinated vinyl chloride-vinyl component type copolymer having low temperature stability according to claim 1, wherein the amount of said vinyl chloride repeating units is from about 80 percent to about 93 percent by weight based upon the total weight of vinyl chloride and vinyl component repeating units, and wherein the amount of said vinyl component repeating units is from about 7 percent to about 20 percent by weight based upon the total weight of said vinyl chloride repeating units and said vinyl component repeating units.

3. A chlorinated vinyl chloride-vinyl component type copolymer having low temperature stability according to claim 2, wherein said copolymer contains from about 61 percent to about 65 percent by weight of chlorine therein, wherein the amount of said vinyl chloride repeating units is from about 85 percent to about 92 percent by weight based upon the total weight of said vinyl chloride and said vinyl component repeating units, and wherein the amount of said vinyl component repeating units is from about 8 percent to about 15 percent by weight based upon the total weight of said vinyl chloride and said vinyl component repeating units.

4. A chlorinated vinyl chloride-vinyl component type copolymer having low temperature stability according to claim 3, wherein said stability at 120° C. for 20 minutes is 0.0030 mole percent or less and wherein said vinyl component is made from vinyl acetate.

5. A chlorinated vinyl chloride-vinyl component type copolymer having low temperature stability according to claim 1, including said copolymer having a stability at 170° C. for 20 minutes as measured by hydrogen chloride elimination of 0.100 mole percent or less.

6. A chlorinated vinyl chloride-vinyl component type copolymer having low temperature stability according to claim 5, wherein said vinyl component is made from vinyl acetate.

7. A chlorinated vinyl chloride-vinyl component type copolymer having low temperature stability according to claim 6, wherein the amount of said vinyl chloride repeating units is from about 80 percent to about 93 percent by weight based upon the total weight of vinyl chloride and vinyl component repeating units, and wherein the amount of said vinyl component repeating units is from about 7 percent to about 20 percent by weight based upon the total weight of said vinyl chloride repeating units and said vinyl component repeating units.

8. A chlorinated vinyl chloride-vinyl component type copolymer having low temperature stability according to claim 7, wherein said copolymer contains from about 61 percent to about 65 percent by weight of chlorine therein, wherein the amount of vinyl chloride repeating units is from about 85 percent to about 92 percent by weight based upon a total weight of said vinyl chloride and said vinyl component repeating units, and wherein the amount of said vinyl component repeating units is from about 8 percent to about 15 percent by weight based upon the total weight of said vinyl chloride repeating units and said vinyl component repeating units.

9. A chlorinated vinyl chloride-vinyl component type copolymer having low temperature stability according to claim 1, wherein said low temperature stabilized chlorinated vinyl chloride-vinyl component type copolymer is made by heating a chlorinated vinyl chloride-vinyl component type copolymer to a temperature of at least 100° C. and subsequently applying a chlorine partial pressure of from about 2 to about 60 psia.

10. A chlorinated vinyl chloride-vinyl component type copolymer having low temperature stability according to claim 4, wherein said low temperature stabilized chlorinated vinyl chloride-vinyl component type copolymer is made by heating a chlorinated vinyl chloride-vinyl component type copolymer to a temperature of at least 100° C. and subsequently applying a chlorine partial pressure of from about 2 to about 60 psia.

11. A chlorinated vinyl chloride-vinyl component type copolymer having low temperature stability according to claim 7, wherein said low temperature stabilized chlorinated vinyl chloride-vinyl component type copolymer is made by heating a chlorinated vinyl chloride-vinyl component type copolymer to a temperature of at least 100° C. and subsequently applying a chlorine partial pressure of from about 5 to about 30 psia.

* * * * *